United States Patent
Fiessler

(10) Patent No.: US 6,919,555 B2
(45) Date of Patent: Jul. 19, 2005

(54) GUARD DEVICE FOR MACHINES SUCH AS BENDING PRESSES, CUTTING MACHINES, STAMPING MACHINES OR THE LIKE

(75) Inventor: Lutz Fiessler, Aichwald (DE)

(73) Assignee: Fiessler Elektronik oHG, Esslingen (DE)

( * ) Notice: Subject to any disclaimer, the term of this patent is extended or adjusted under 35 U.S.C. 154(b) by 223 days.

(21) Appl. No.: 10/318,066

(22) Filed: Dec. 13, 2002

(65) Prior Publication Data

US 2003/0132371 A1 Jul. 17, 2003

(30) Foreign Application Priority Data

Dec. 13, 2001 (DE) .......................................... 101 61 222
Jul. 19, 2002 (DE) .......................................... 102 32 795

(51) Int. Cl.[7] ............................................ B21D 55/00
(52) U.S. Cl. ........................ 250/221; 72/20.2; 72/21.3; 100/348
(58) Field of Search ................................ 72/20.2, 21.1, 72/21.3; 250/221; 340/545.3, 555–557; 100/348; 192/130

(56) References Cited

U.S. PATENT DOCUMENTS

| | | | | |
|---|---|---|---|---|
| 4,166,369 A | * | 9/1979 | Nakajima | 72/21.1 |
| 4,357,820 A | * | 11/1982 | Blanchard | 72/389.4 |
| 5,579,884 A | * | 12/1996 | Appleyard et al. | 192/130 |
| 6,316,763 B1 | * | 11/2001 | Appleyard et al. | 250/221 |
| 6,389,860 B1 | * | 5/2002 | Stalzer | 72/1 |

* cited by examiner

Primary Examiner—Thanh X. Luu
Assistant Examiner—Stephen Yam
(74) Attorney, Agent, or Firm—Browdy & Neimark, P.L.L.C.

(57) ABSTRACT

A guard device for machines such as bending presses, cutting machines, stamping machines or the like, has a first machine part which performs operative movements toward a second machine part. A laser photoelectric detector arrangement is attached to the first machine part and possesses at least one photoelectric detector, whose light beam shines in an adjustable secure distance from this machine part. On interruption of the light beam the operative motion is arrested. An abutment arrangement on the second machine part prevents interruption of the light beam. The photoelectric detector arrangement is either so laterally offset that an interruption of the light beam by the first machine part is excluded during further movement or the photoelectric detector arrangement is arranged on the first machine part in the working path thereof. A switch, able to be worked on reaching the abutting position, deactivates photoelectric detector.

13 Claims, 3 Drawing Sheets

GUARD DEVICE FOR MACHINES SUCH AS BENDING PRESSES, CUTTING MACHINES, STAMPING MACHINES OR THE LIKE

BACKGROUND OF THE INVENTION

The invention relates to a guard device for machines such as bending presses, cutting machines, stamping machines or the like, wherein a first machine part performs operative movements toward a second machine part, comprising a photoelectric detector arrangement attached to the first machine part by means of a holding means and able to be repositioned in relation to the machine part, said photoelectric detector arrangement being more particularly a laser photoelectric detector arrangement, which possesses at least one photoelectric detector, whose light beam shines perpendicular to the operative movement and in an adjustable secure position is at a secure distance from such machine part in a direction toward the other machine part, and a locking means for halting operative movement on interruption of the light beam.

THE PRIOR ART

Such guard means are for example disclosed in the German patent publication 2,75o,234 B1, the German patent publication 19,717,299 A1, the patent publication WO 97/25568, the European patent publication 0264349 B1 and the European patent publication 0146460 and primarily serve to protect the operator and to prevent his hand being clamped or crushed between the two machine parts. Obviously the photoelectric detector arrangement may also prevent any objects happening to be between the first and the second machine part from being damaged or otherwise affected, damage to the machine itself also having to be avoided. In the case of the known guard means the first machine part came to a halt at the end of the closing movement shortly before reaching the workpiece to be processed, since the laser beam was interrupted when the first machine part got as close to the workpiece as allowed by the secure distance. In order to prevent this in the case of known guard means the photoelectric detector arrangement was deactivated near the end of the closing movement. This is however something which can be tolerated, because at the same time there is a switch-over from the more dangerous high speed to the safer inching speed. In the case of machines without speed switching, such a deactivation is not permissible and the guard means has to be active during the entire closing movement.

SHORT SUMMARY OF THE INVENTION

One object of the invention is to create a guard means for the first machine part in the case which of the first machine part performs its closing movement toward the second machine part at an unchanged speed, the guard means being active during the full closing movement.

In order to achieve these and/or other objects appearing from the present specification, claims and drawings, in the present invention for the photoelectric detector arrangement and on the second machine part an abutment arrangement is arranged which is adapted to prevent interruption of the light beam by a workpiece arranged on the second machine part, the holding means has play permitting further movement of the first machine part in relation to the photoelectric detector arrangement after reaching the abutting position and furthermore the photoelectric detector arrangement is either so laterally offset that an interruption of the light beam by the first machine part is excluded during such further movement or the photoelectric detector arrangement is arranged on the first machine part in the working path thereof, a switch means, able to be worked on reaching the abutting position, being designed for deactivation of the at least one photoelectric detector.

In the guard means of the invention the abutment arrangement advantageously serves to ensure that the photoelectric detector arrangement halts before reaching the workpiece arranged on the second machine part so that the workpiece can not cause any interruption of the light beam. Owing to the play in the holding means the top machine part may then move on farther and complete the closing movement without itself interrupting the light beam during such further movement, since the photoelectric detector arrangement is arranged laterally offset in relation to the path of motion of the first machine part. This means that the guard means may remain active during the entire closing time and the danger of injury or damage is prevented thereby. The speed of closing does not have to be limited, something meaning simpler control and more rapid working movements or, respectively, a more rapid working strokes. In the alternative design, in the case of which the photoelectric detector arrangement is arranged underneath the first machine part in the path of movement of the same, the switch means for deactivation serves to ensure that the at least one photoelectric detector is not worked by the first machine part on further movement thereof. This design also offers the advantage that the speed of closing does not have to be limited.

The dependent claims relate to features which constitute advantageous further developments and improvements of the guard means as recited in claim 1.

It is an advantage to provide force means to maintain the photoelectric detector arrangement in the secure position with a predetermined force, more particularly a spring force, gravity, magnetic force and/or fluid force. At the end of the closing movement after reaching the abutting position the photoelectric detector arrangement accordingly is shifted against the force of the force means in relation to machine part and during return movement is automatically moved back into the secure position.

In a particularly suitable design of the invention the holding means comprises two guide rods bearing the photoelectric detector arrangement, which run parallel to the working movement direction in holding elements arranged on the first machine part, abutment means limiting the movement being provided, one abutting position setting the secure position of the photoelectric detector arrangement and the guide rods being held in such abutting position by the force means. Accordingly the secure position is exactly held and during return movement of the first machine part is returned to.

In accordance with a further advantageous development of the invention the abutment means are adapted to be slid after overcoming the stiction (static friction) of a clamping means or releasable detent, the stiction force or, respectively, the releasing force being preferably larger than the holding force of the force means. This leads to the advantage that on interchanging the first machine part or of a corresponding tool or of a tool arranged on the first machine part during the first working movement completely automatic adjustment of the photoelectric detector arrangement may be performed in relation to the new tool. For this purpose firstly the distance between photoelectric detector arrangement and the first machine part is set to be oversize in a coarse setting step. When the photoelectric detector arrangement reaches the abutting position in the first closing movement, there is then a relative movement against the force of the force means and then the abutment means are moved, by overcoming the stiction force or the detent action, until the closing movement is completed. The adjustment is then completed fully automatically.

In order to increase safety the photoelectric detector arrangement may comprise a plurality of photoelectric detectors arranged in two planes arranged one after the other in the working movement direction and/or perpendicularly to same. The number and the distance apart of the photoelectric detectors and their distance from the first machine part is dependent on the braking distance and the braking time of the machine and the speed reached. Photoelectric detectors arranged ahead in one plane serve to prevent the operator's fingers, for example, entering the danger zone just before the end of the closing movement and before the closing movement is arrested. Their distance from the danger point is for its part dependent on the braking time of the machine and on the speed of a hand-slipping on the second machine part or, respectively, on the workpiece. For special applications such a photoelectric detector placed with a lead or such photoelectric detectors may be deactivated.

The photoelectric detector arrangement may in a convenient manner comprise a further photoelectric detector arranged in the path of motion of the first machine part, which after correct positioning of the photoelectric detector arrangement may be deactivated. This further photoelectric detector offers the advantage of preventing a closing movement being started, when after a change from a low to a high first machine part or, respectively, a tool arranged on it, the operator forgot to correctly set the position of the guard means. This further photoelectric detector is preferably deactivated by switching means in the or on the abutment arrangement on reaching the photoelectric detector arrangement. This may in principle also be effected by the signals from the machine's controller.

It is an advantage for the switch means to comprise means for causing sequential deactivation of the photoelectric detectors arranged underneath the first machine part on reaching the abutting position, the deactivation starting at the photoelectric detector nearest to the first machine part. Accordingly in each case only that photoelectric detector is deactivated just prior to the point in time at which the first machine part would cause an interruption. This means that the gap, which decreases in size, between the two machine parts is monitored practically till the end.

Additional protection is constituted by a further photoelectric detector arrangement placed to the fore, which is laterally offset in relation to the at least one photoelectric detector arrangement placed underneath the first machine part. This additional photoelectric detector arrangement prevents the operator's fingers finding their way into the danger zone just prior to the end of the closing movement, before the closing movement is completed. For the processing of unusual workpiece geometries this further photoelectric detector arrangement may be deactivated by the intermediary of switching off means. In order to ensure that there is no permanent deactivation automatic switching on means are provided for activation of such further deactivated photoelectric detector arrangement, which are more especially able to be operated by the opening movement of the first machine part or by limit switches on the abutment device or the like.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
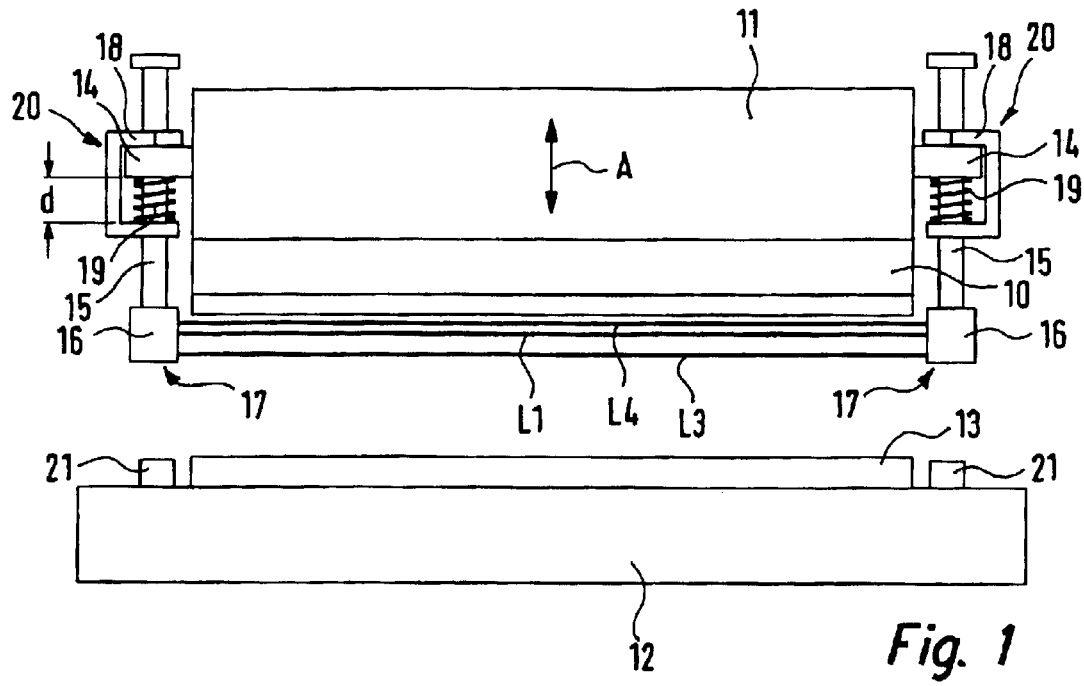
FIG. 1 shows a bending press or brake as seen looking toward a long side thereof, said press being provided with a security means, the top machine part being in the raised position.

The bending press depicted in the figures comprises essentially a top machine part 11 provided with a top tool 10 or stamp, such top machine part 11 being able to be moved toward a workpiece 13 on a fixed, bottom machine part 12. The direction of motion is indicated in FIG. 1 by a double arrow A. The workpiece 13 can for example be a piece of sheet metal to be bent. In principle it is possible in an alternative design for the top machine part 11 to be stationary and for the bottom machine part 12 to be able to be moved.

The other portions of the generally known bending press are not illustrated for simplification. The cross sectional configuration of the top tool 10 and any bottom tool on the bottom machine part 12 are varied in accordance with the particular application. In this respect attention is called to the prior art for example.

Holding elements 14 are arranged on the mutually opposite narrow sides of the top machine part 11 to serve as vertical guides for guide rods 15. At their bottom ends the two guide rods respectively have regions 16 of a photoelectric detector arrangement 17. In this case it is a question of a laser photoelectric detector arrangement, although other types of photoelectric detector arrangement could in principle be employed. In the first working embodiment it is a question of four photoelectric detectors, whose light beams L1 through L4 (see FIGS. 4 through 6) shine parallel to the longitudinal extent of the top tool 10. In this case light transmitters and light receivers are arranged in the two portions 16 of the photoelectric detector arrangement 17.

In the case of the guide rods 15 U-like abutment elements 18 are attached, that fit around the holding elements 14. The inner clearance between the limbs of the U-like abutment elements 18 is greater by an amount d than the height of the holding elements 14 so that the guide rods 15 and accordingly the photoelectric detector arrangement may move up and down by this amount d in relation to the top machine part 11. By means of compression springs 19 and gravity the holding elements 14 are held on the top abutment of the abutment elements 18. The force of the compression spring 19 is in this respect so designed that this abutment position is maintained even during oscillations of the machine. In a simpler design it is possible for this holding position to be maintained by gravity without any compression spring 19.

In an alternative design it is possible to arrange U-like holding elements, for example, on the top machine part 11 which serve as a guide for the guide rods 15. As abutment elements clamping parts, which are clipped on the guide rods 15 between the U limbs, then serve as abutment elements, such clamping parts being able to be moved up and down by virtue of the guide rods 15. The abutting position during the downward movement of the top machine part is then the position on the bottom limb and may be held solely by gravity and/or by means of the compression springs acting from above.

Figure 4:
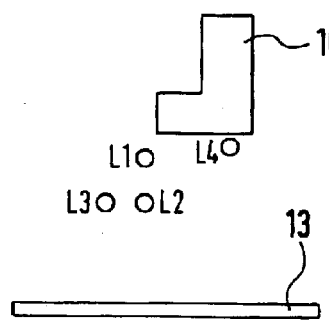
FIG. 4 is a cross sectional elevation of the arrangement and the position of a first embodiment of the invention in the form of a photoelectric detector arrangement as in FIG. 1.
Figure 5:
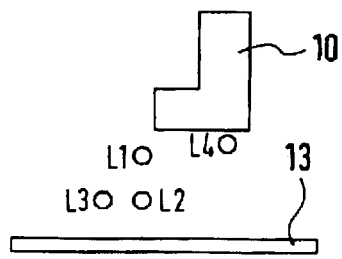
FIG. 5 is a cross sectional elevation of the arrangement and the position of the first embodiment of a photoelectric detector arrangement as in FIG. 2.
Figure 6:
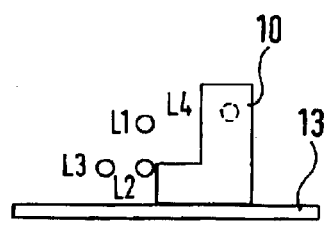
FIG. 6 is a cross sectional elevation of the arrangement and the position of the first embodiment of a photoelectric detector arrangement in accordance with FIG. 3.

In the case of the first embodiment of the invention as shown in FIGS. 4 through 6 three photoelectric detectors are so arranged that their light beams L1 through L3 are offset in relation to the vertical path of the top tool 10 to the front, that is to say toward the operator. The number of such photoelectric detectors may also be larger or smaller and in the simplest case a single photoelectric detector is provided associated with the light beam L2. The criterion for the number and the distance apart of the photoelectric detectors in relation to the top tool 10 is the braking path and the braking time of the machine after being turned off owing to the interruption of a light beam. Furthermore, the wedge shape and the speed of the operator's hand slipping on the workpiece and the necessary detection of his fingers is taken into account in setting the distance between the elements L2 and L3. The distance between the beams or rays L1 and L2 on the one hand and on the other hand L2 and L3 will for example amount to between 4 and 14 mm. The photoelectric detector placed to the fore, which uses the light beam L3 prevents the operator's fingers moving into the danger zone just before the end of the closing movement. For handling unusual workpiece geometries the photoelectric detector placed to the fore having the light beam L3 may be deactivated by an additional function or by switching means. In order to ensure that there is no constant deactivation, following every closing movement of the top machine part 11 such deactivation may be overridden, for example owing to the opening movement or some other machine signals. The function of the photoelectric detector located in the path of motion of the top tool 10 and using the light beam L4 will be explained in detail later.

Figure 7:
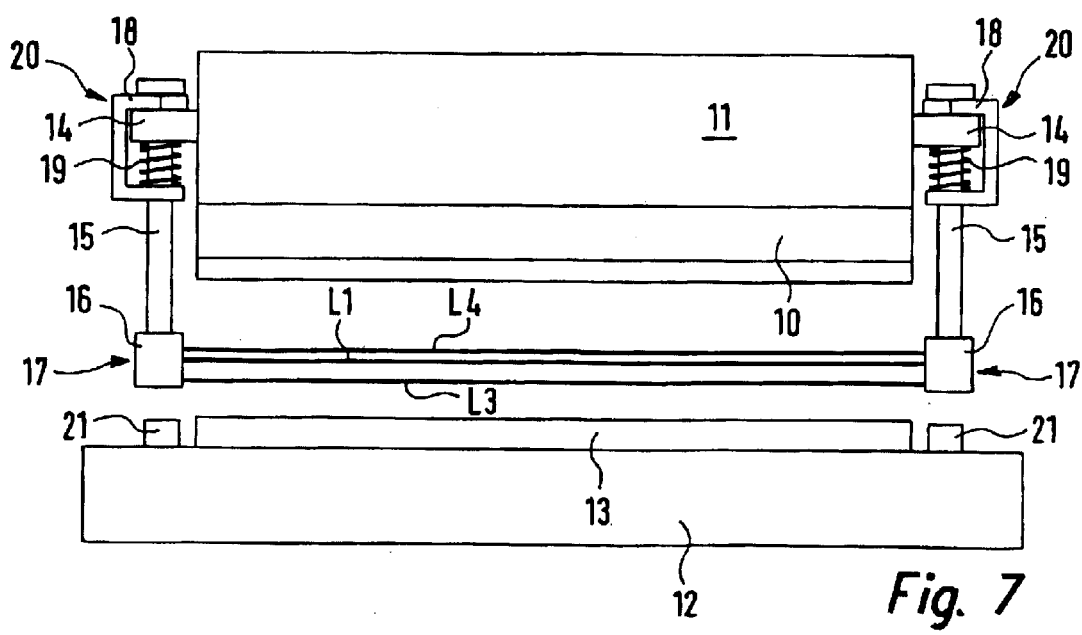
FIG. 7 shows a bending press after tool changing before setting the photoelectric detector arrangement.

As shown in FIGS. 1 and 4 the photoelectric detector arrangement 17 is so set that the light beam L1 is located in a plane directly underneath the lowest portion of the top tool 10 and the light beams L2 and L3 again, in accordance with the above rules, lie in a plane lower down. This setting is performed by means of the holding means 20 comprising the holding elements 14, the guide rods 15 and the abutment elements 18. Firstly as indicated in FIG. 7 a large distance is set between the photoelectric detector arrangement 17 and the top tool 10. During a first closing movement the top machine part 11 moves downward until the photoelectric detector arrangement 17 abuts abutment elements 21 arranged on the bottom machine part 12. The height of such abutment elements 21 may be changed and is so set that no one light beam is interrupted by the workpiece 13. During further movement of the top machine part 11 downward the holding elements 14 are moved against the force of the compression spring 19 as far as the bottom abutment of the elements 18. After this the abutment elements 18 clamped on the guide rods 15 are moved downward overcoming the clamping action until the top tool 10 reaches the workpiece 13 or, in the case of some applications, penetrates the workpiece and thus reaches its terminal position. The clamping force of the abutment elements 18 on the guide rods 15 is in this case larger than the spring force of the compression spring 19. During the opening movement, that is to say during the following upward motion of the top machine part 11, firstly the holding elements 14 are moved by the force of the compression spring 19 as far as the top abutment of the elements 18. In this position the photoelectric detector arrangement 17 is in the desired position and in a position in relation to the top tool 10 as shown in FIG. 1. The correct distance is set by the displacement d in the U-like abutment elements 18.

As an alternative to clamping of the abutment elements 18 on the guide rods 15 the guide rods may have detent teeth for example with which a detent element (for example a spring loaded detent ball) of the abutment elements 18 is engaged. Instead of the clamping force in the case of this embodiment the detent force is overridden, which again for its part must be larger than the spring force of the compression spring 19.

Figure 2:
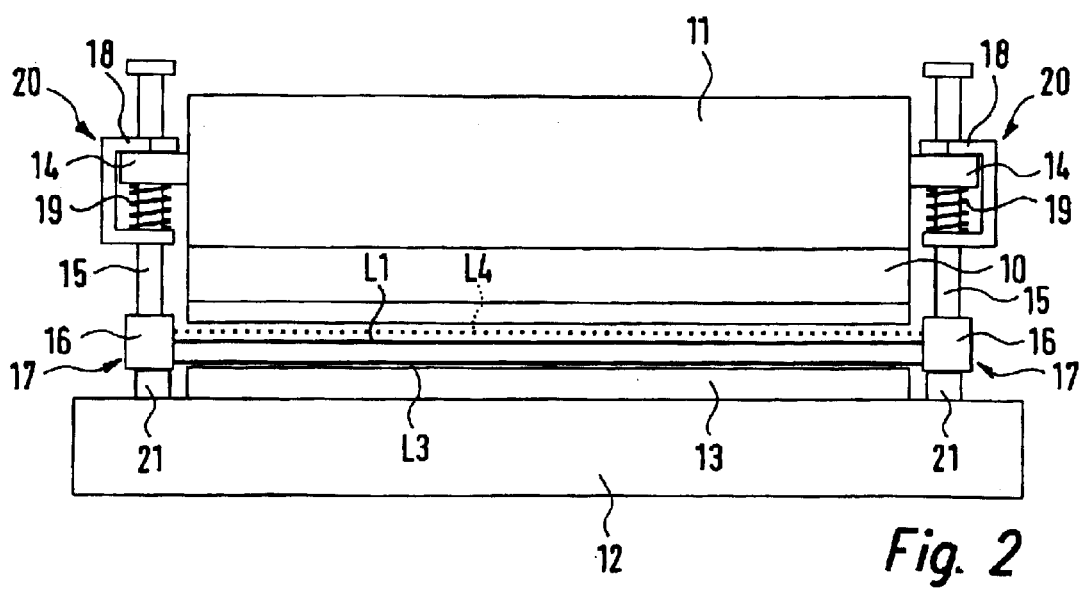
FIG. 2 shows the same bending press in the nearly closed position, when photoelectric detector arrangement has reached its abutting position.
Figure 3:
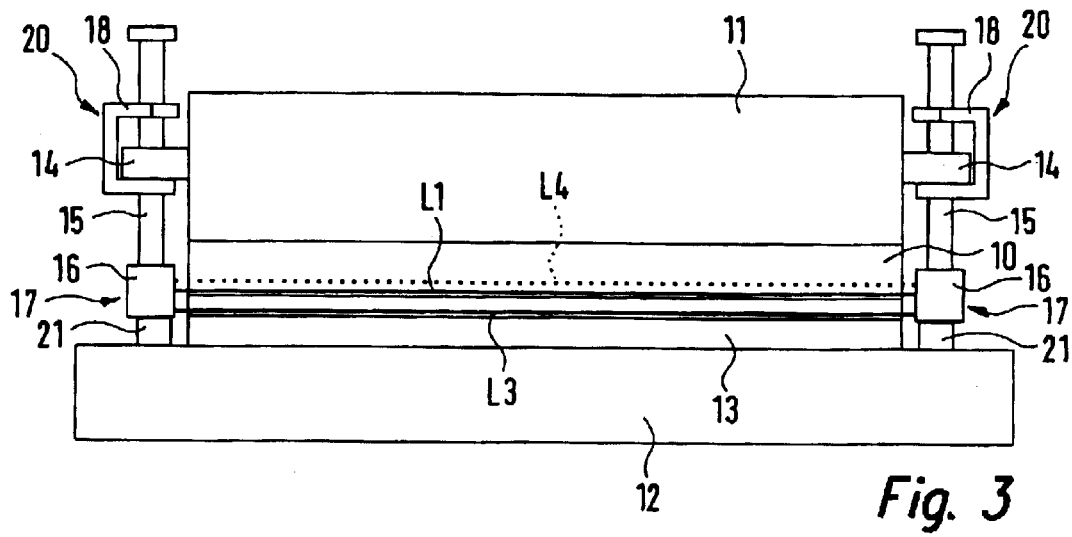
FIG. 3 shows the same bending press in the completely closed position.

The normal closing movement of the top machine part 11 or, respectively, of the top tool 10 is represented in FIGS. 1 through 3 or, respectively, in the corresponding FIGS. 4 through 6. Taking as a starting point the position in accordance with FIG. 1 the top machine part 11 and with it the top tool 10 moves downward vertically in the direction A of the arrow, the photoelectric detector arrangement 17 being correspondingly entrained as well. If one of the light beams L1 through L3 is interrupted by a obstruction, as for example the hand of the operator or some object, which has been improperly moved into the path of motion, there will be a security switch-off of the movement. In the other possible case the downward motion will be continued until the photoelectric detector arrangement 17 detects the abutment elements 21 in accordance with FIG. 2. During further movement of the top tool 10 the holding elements 14 will be moved downward against the force of the compression spring 19, whereas the photoelectric detector arrangement 17 will keep at the same level. The closing movement terminates with the arrival of the top tool 10 at the workpiece 13 or, respectively, in the case of a cutting machine the bottom terminal position of the top tool 10. The light beams L1 through L3 are in this case not interrupted, since they are shifted to the fore relatively to the path of motion of the top tool 10. Accordingly they will remain active during the full closing movement.

The opening and, respectively, rearward movement takes place in the opposite order and has been described already in connection with the setting operation.

The additional photoelectric detector, arranged directly underneath the top tool 10, with the light beam L4 prevents any closing movement being started, if after changing over from a low to a high top tool 10 the operator forgot to correctly position the guard means. This photoelectric detector using the light beam L4 may for instance be deactivated by the limit switches which are tripped when the photoelectric detector arrangement 17 meets with the abutment elements 21. Such deactivation may for example be caused by signals for the machine's controller, f. i. by signals dependent on the opening movement. For bending of for example box-like parts this additional this additional photoelectric detector may also be deactivated. In order to ensure that this deactivation does not become permanent, deactivation may be for example overridden after each closing movement by the said terminal switches or by signals from the machine's controller.

In order to increase safety the machine provided with a security means may also for example only be turned on, when all photoelectric detectors are switched or, respectively, are activated.

Alternative arrangements and developments of the photoelectric detectors may for instance be in accordance with the initially mentioned German patent publication 19,717, 299 A1.

The guard means described is naturally not limited to bending presses, cutting machines and stamping machines, and may be employed in all cases where two machine parts perform working movement toward one another so that there is no damage of objects or injury to body parts between them. For instance it is possible for the guard means of the invention also to be employed for doors, shutters, slides, planing machines or the like.

Figure 8:
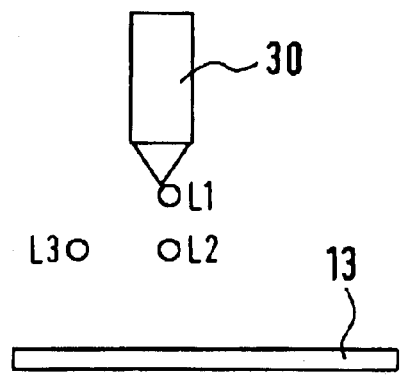
FIG. 8 is a cross sectional view of the arrangement and the position of a second embodiment of a photoelectric detector arrangement in accordance with FIG. 1.
Figure 9:
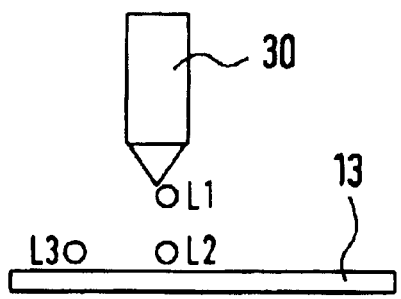
FIG. 9 is a cross sectional view of the arrangement and the position of the second embodiment of a photoelectric detector arrangement according to FIG. 2.
Figure 10:
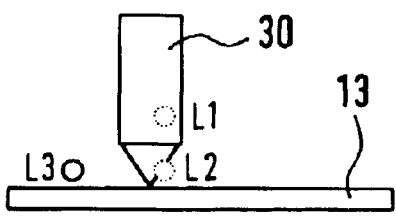
FIG. 10 is a cross sectional view of the arrangement and the position of the second embodiment of the invention in the form of a photoelectric detector arrangement in accordance with FIG. 3.

The photoelectric detector arrangement 17 in accordance with FIGS. 1 through 3 can in accordance with a second embodiment of the invention furthermore have the arrangement depicted in FIGS. 8 through 10. The top tool 30 here has a configuration departing from that of the first embodiment of the invention. In principle it is possible for the top tool to have a form dependent on the working operation to be performed and on the workpiece. The light beams L1 and L2 of the photoelectric detector arrangement 17 are so offset from the positions in the first embodiment that they are placed in relation to one another underneath the top tool 30 as to be in the path of movement thereof. In this case the light beam L1 is directly underneath the top tool 30.

Starting in the position in accordance with FIG. 8 the top machine part 11 and, respectively, the top tool 30 will moved vertically downward, the photoelectric detector arrangement 17 being correspondingly entrained as was the case with the first embodiment of the invention. The downward movement takes place until in accordance with FIG. 9 the photoelectric detector arrangement 17 meets with the abutment elements 21. On further movement of the top tool 10 the holding elements 14 are again displaced downward against the force of the compression spring, whereas the photoelectric detector arrangement 17 keeps at the same level. In this respect firstly the light beam L1 would be interrupted by the top tool 30. This is prevented by a switching means, not illustrated in detail, which on reaching the abutment position is triggered and firstly deactivates the top photoelectric detector (light beam L1). Shortly thereafter the light beam L2 as well of the photoelectric detector underneath is deactivated so that there is no interruption, which would stop movement, on reaching the workpiece 13 as depicted in FIG. 10. The number of the photoelectric detectors arranged over one another may be larger or smaller as well. In the case of a single photoelectric detector the deactivation will take place on reaching the abutment position, whereas in the case of a plurality of photoelectric detectors there will be a sequential deactivation starting at the top so that there will be no interruption by the top tool coming from the top. The tool may consequently keep to its full working speed. Sequential deactivation may be controlled either in a time-dependent or displacement-dependent fashion.

The photoelectric detector using the light beam L1 may additionally perform the function of the photoelectric detector L4 of the first working embodiment. The function of the photoelectric detector using the light beam L3 is in principle the same as that of the first working example.

What is claimed is:

1. A guard device for machines such as bending presses, cutting machines, stamping machines or the like, wherein a first machine part performs operative movements toward a second machine part, comprising a photoelectric detector arrangement attached to the first machine part by means of a holding means and able to be repositioned in relation to the first machine part, said photoelectric detector arrangement being more particularly a laser photoelectric detector arrangement, which possesses at least one photoelectric detector, producing a light beam that shines perpendicular to the operative movement and in an adjustable secure position is at a secure distance from the first machine part toward the second machine part, and a locking means for halting operative movement on interruption of the light beam and wherein for the photoelectric detector arrangement and on the second machine part an abutment arrangement is arranged which is adapted to prevent interruption of the light beam by a workpiece arranged on the second machine part, the holding means has play permitting further movement of the first machine part in relation to the photoelectric detector arrangement after reaching the abutting position and furthermore the photoelectric detector arrangement is either so laterally offset that an interruption of the light beam by the first machine part is excluded during such further movement or the photoelectric detector arrangement is arranged on the first machine part in the operative path thereof, a switch means, able to be worked on reaching the abutting position, being designed for deactivation of the at least one photoelectric detector.

2. The guard device as set forth in claim 1, wherein force means are provided to hold the photoelectric detector arrangement in the secure position using a predetermined force, such force means acting more particularly by spring means, gravity, magnetic force and/or fluid force.

3. The guard device as set forth in claim 2, wherein the holding means comprises two guide rods bearing the photoelectric detector arrangement, which slide parallel to the working movement direction in holding elements arranged on the first machine part, abutment means limiting the movement being provided, one abutting position setting the secure position of the photoelectric detector arrangement and the guide rods being held in such abutting position by the force means.

4. The guard device as set forth in claim 3, wherein the abutment means are involved in overriding friction of a clamping device or of a releasable detent means.

5. The guard device as set forth in claim 4, wherein the friction or detent overriding force is larger than the holding force of the force means.

6. The guard device as set forth in claim 1, wherein the photoelectric detector arrangement comprises at least two photoelectric detectors in two planes arranged in the operative movement direction and/or perpendicular to the operative movement direction, said planes being arranged one behind the other.

7. The guard device as set forth in claim 1, wherein the photoelectric detector arrangement comprises a further photoelectric detector arranged in the path of motion of the first machine part or of a tool arranged thereon, and the further photoelectric detector is able to be deactivated after correct positioning of the photoelectric detector arrangement.

8. The guard device as set forth in claim 7, wherein said switch means are arranged for deactivation of the further photoelectric detector on the photoelectric detector being reached.

9. The guard device as set forth in claim 6, wherein the switch means comprises means for causing sequential deactivation of the photoelectric detectors on reaching the abutment position, the deactivation starting at the photoelectric detector next to the first machine part.

10. The guard device as set forth in claim 1, comprising a further photoelectric detector arrangement having at least one photoelectric detector and arranged with a lateral offset in relation to the at least one photoelectric detector and further comprising switching off means for deactivation of such further photoelectric detector arrangement.

11. The guard device as set forth in claim 10, comprising automatic switching on means for the activation of the deactivated further photoelectric detector arrangement, such means being more particularly worked by the opening movement of the first machine part or by limit switches on the abutment device.

12. The guard device as set forth in claim 9, wherein the photoelectric detectors are arranged underneath the first machine part.

13. The guard device as set forth in claim 10, wherein the at least one photoelectric detector is arranged underneath the first machine part.

* * * * *